R. ROWLEY & J. J. COOMBER.
COMPRESSION APPARATUS FOR TIRE SHOE WRAPPINGS.
APPLICATION FILED AUG. 4, 1909.
962,102.
Patented June 21, 1910.
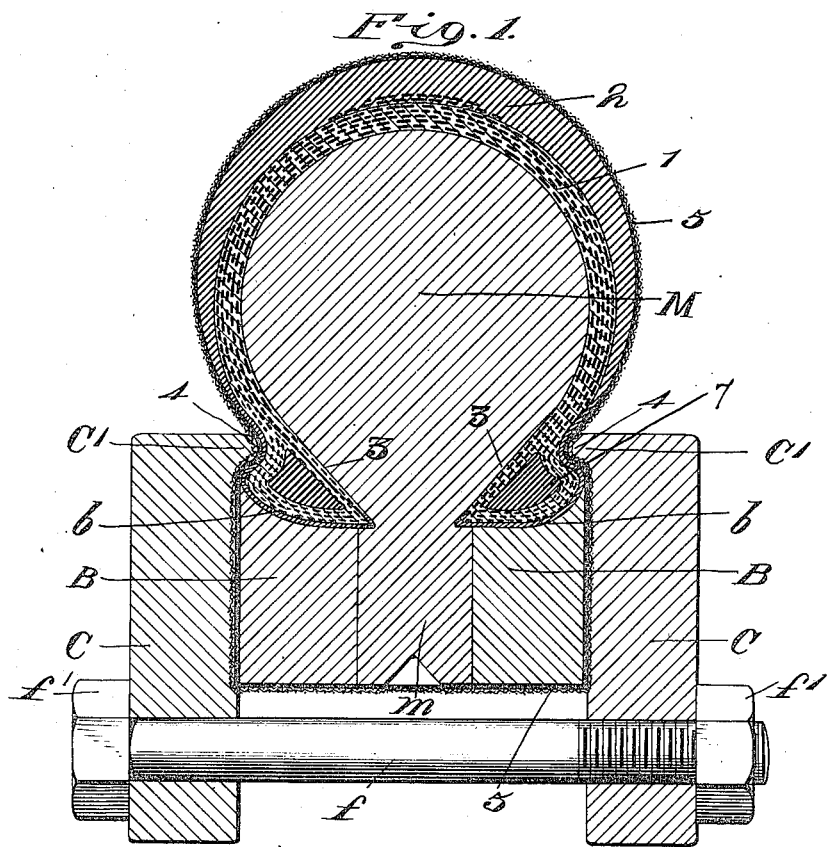
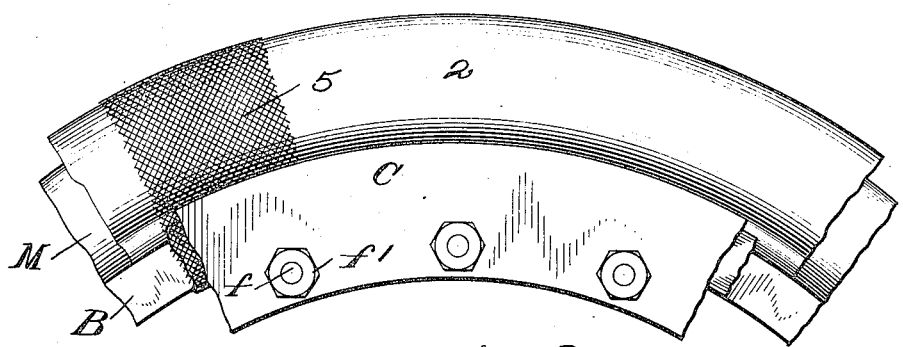

UNITED STATES PATENT OFFICE.

ROBERT ROWLEY, OF NEW YORK, N. Y., AND JAMES J. COOMBER, OF JERSEY CITY, NEW JERSEY, ASSIGNORS, BY MESNE ASSIGNMENTS, TO RUBBER COMPANY OF AMERICA, A CORPORATION OF DELAWARE.

COMPRESSION APPARATUS FOR TIRE-SHOE WRAPPINGS.

962,102.

Specification of Letters Patent.   Patented June 21, 1910.

Application filed August 4, 1909.   Serial No. 511,189.

*To all whom it may concern:*

Be it known that we, ROBERT ROWLEY, a citizen of the United States, residing at New York city, in the county of New York and State of New York, and JAMES J. COOMBER, a citizen of the United States, residing at Jersey City, in the county of Hudson and State of New Jersey, have invented certain new and useful Improvements in Compression Apparatus for Tire-Shoe Wrappings, of which the following is a specification, reference being had therein to the accompanying drawings.

This invention is a device useful in the manufacture of clencher shoes for tensioning a tubular fabric wrapping (applied to the shoes during process of construction,) tightly over the exterior rubber tread and its sides and down into and on the walls of the annular, lateral clencher grooves with which the shoes are oppositely provided.

Nobody, prior to our invention, so far as we know, has either made a device for this purpose, or so operated the wrapping. Our new method is claimed in our application Serial No. 511,188, of even date of execution and filing.

In the drawings, illustrating the principle of our invention and the best mode now known to us of applying that principle, Figure 1 is a cross-section of the shoe, the wrapping and our new apparatus, on line 1—1 of Fig. 2, which shows a side elevation, on a smaller scale, of what is shown in Fig. 1.

In the drawings, the carcass 1 made of alternating plies of canvas and rubber, and the therewith assembled exterior tread 2 of rubber, are of typical clencher tire shoe formation, being made with the usual beads 3 and lateral, annular clencher grooves 4 above the beads, one groove on one side and the other on the other side of the shoe.

The wrapping 5,—a strip of canvas,—in accordance with our method is wound entirely around the shoe, in contact therewith exteriorly at all points except on the under sides of the beads. This arrangement of the wrapping is new with us, and involves the production of new apparatus to carry our ideas into effect.

The assembled carcass and rubber tread are mounted on the annular mandrel M shown with an interior annular projection $m$ on its inner periphery. This projection is not essential. Two bead-supports B, B are mounted at each side of the projection $m$, by which they are spaced apart. The exterior diameter of the bead-supports is sufficiently less than the exterior diameter of the mandrel's wall portions opposed to the outer peripheral walls of the bead-supports, to receive the beads of the shoe between such opposed surfaces. The outer peripheral walls $b$ of the bead-supports may be of any desired contour, according to the desired contour of the opposed surfaces of the beads. They are shown slightly dished. A pair of compression-plates C, C is mounted laterally of the mandrel projection and bead-supports, and these plates are adapted to be squeezed toward each other and the intermediate mandrel projection and supports by any suitable means, such, for example, as the bolts $f$ and nuts $f'$. Each plate C is provided, at its peripheral inner edge, with a lateral annular projection C' of a contour corresponding to the contour of the clencher grooves in the shoe sides. The function of these projections C' is to stretch the temporary wrapping over the tread's peripheral and side portions and also down into and upon the walls of the clencher grooves, as the plates C are squeezed together. This prevents the squeezing outwardly of the rubber of the two sides, and the consequent loosening of the rubber at places on the carcass that is characteristic of older methods. It results in the uniform production of firsts without production of seconds.

It is not to be understood that it is necessary to provide the mandrel M with any interior rib or any means for limiting the inward movement, if any, of the bead-supporting rings B. In practice, the rib may be dispensed with or made separate from the mandrel and integral with the rings B, for example. Nor is it necessary that the clamping plates C contact at any point with the wrapping on the outer sides of the rings B. What we have shown is a convenient embodiment of our apparatus. The function of the spaces wherein the beads or margins are contained is merely to retain the marginal parts and so hold the shoe in position for wrapping. The walls of these spaces do not act compressively on the shoe margins; but when the inwardly-projecting, lip-like projections C' of the plates C press simultaneously upon the wrapper opposed to the grooves of the shoe exposed except at its margins, the wrapper is forced inwardly, straining the rubber of the shoe inwardly toward the axial center of the shoe and compressively forcing the margins into their containing spaces. When the lips C' are pushed in sufficiently, the so wrapped and strained shoe is exposed to an "open heat," that is, to live steam for vulcanization.

As will be understood by all skilled in the art, our apparatus, the wrapping and assembled carcass and tire, are put in a vulcanizing chamber, but it is a factor of our invention that by our system only one heat is necessary.

After vulcanization, the apparatus and wrapping are removed. The exterior surface of the shoe, excepting the outer surfaces of the beads at b, having been tightly bound on the mandrel by the wrapping, are of uniform appearance and condition, without pits or irregularities; and the fact that the greater part of the shoe, especially above and between the beads, is unconfined by metal or anything excepting the fabric wrapping, prevents the blistering and sponging, due to vaporization of contained moisture, common to systems where the assembled carcasses and treads are inclosed in molds for vulcanization, and resulting in a loosening up of the shoe on the carcass or of the plies of the carcass, to a greater or less extent. Such loosening decreases the strength and durability of the shoes.

The outer peripheral surfaces of the bead-supports are shaped conformably to the opposed contour of the shoe beads (which, with the rest of the shoe, are relatively soft as compared with their condition after vulcanization,) and support and maintain the pre-shaped beads or marginal portions in the shape initially given them and which they are to have after vulcanization, during the application of the wrapping compression-plates; the outer surfaces of the bead supports then holding the wrapping, which has a purchase at the inner periphery of the mandrel and bead-supports, out of deforming engagement with the bead heels. To this end, the outer lateral surfaces of the bead-supports, in the form of apparatus shown, are substantially tangent to the bead heels, and constitute a means for directing the wrapping past the outer, inner corners of the bead or margin, so that the wrapping, when strained inwardly into the clencher grooves and at the same time strained inwardly over the tread and sides of the shoe, is kept out of such contact with the bead heels that its outward movement cannot operate to pull or bend them outwardly and thereby deform the clencher grooves; or, cause the annular rubber reinforcements 7 to be forced outwardly and wedge-wise between the adjacent duck plies and so separate them. Our apparatus is adapted to secure one quality of vulcanization (that due to the open cure) from marginal portion to marginal portion of the shoe while the shoe is in a highly condensed and compacted state, from marginal portion to marginal portion. Our apparatus functions in such wise as to prevent deformation of the soft, pre-shaped shoe when the tension is applied to the wrapping, and eliminates that objectionable quality or degree of vulcanization which arises when the vulcanizing heat passes through metal to the shoe,—except at the inner surfaces of the beads, where such quality of vulcanization is least objectionable. From bead heel to bead heel, the shoe produced is of one quality of cure, and without the shoulders around its sides, that are a visible characteristic of many prior makes of tires, the shoulders involving a structural weakness due to the junction of an open-cured tread with shoe sides cured by the passage of heat through metal; and the shoulders being due to the compression of the outer peripheral edges of side plates directly or indirectly contacting with the shoe sides.

Our invention may be embodied in forms different from that shown, if desired.

What we claim is:—

In tire-shoe holding and open cure apparatus, the combination with a tubular, annular wrapping; a rigid purchase therefor; exterior wrapping-tension means operable to strain the wrapping on its purchase, to constrict the wrapping on a contained pre-shaped shoe, and thereby to compact the shoe both circumferentially and transversely from marginal portion to marginal portion; within the wrapping, a rigid, annular, shoe-supporting mandrel and also rigid bead supports, one at one side and the other at the other side of the mandrel, and having an outer peripheral corner portion to support a corner portion of a pre-shaped shoe margin or bead; said exterior tensioning means being mounted to engage the wrapping oppositely and also outwardly of the outer peripheral corners of the bead supports; and means for directing the wrapping, when tension is applied to it, past the corners of the beads or shoe marginal portions to prevent deformation of the marginal portions; said tubular wrapping passing between said exterior tension means and said outer peripheral portions of the bead supports within the wrapping.

In testimony whereof we have hereunto affixed our respective signatures, in presence of two witnesses.

ROBERT ROWLEY.
JAMES J. COOMBER.

Witnesses:
E. S. BEACH,
F. E. NARES.